United States Patent
Xu

(10) Patent No.: US 11,452,285 B2
(45) Date of Patent: Sep. 27, 2022

(54) POSITIONING AND LINE CLAMPING DEVICE CAPABLE OF REALIZING BUFFERING

(71) Applicant: Yifan Xu, Cixi (CN)

(72) Inventor: Yifan Xu, Cixi (CN)

( * ) Notice: Subject to any disclaimer, the term of this patent is extended or adjusted under 35 U.S.C. 154(b) by 0 days.

(21) Appl. No.: 17/325,324

(22) Filed: May 20, 2021

(65) Prior Publication Data

US 2022/0151210 A1 May 19, 2022

(30) Foreign Application Priority Data

Nov. 19, 2020 (CN) .......................... 202011300783.7

(51) Int. Cl.
*A01K 89/01* (2006.01)
*A01K 89/0155* (2006.01)
*A01K 89/027* (2006.01)

(52) U.S. Cl.
CPC ...... *A01K 89/0155* (2013.01); *A01K 89/0111* (2013.01); *A01K 89/027* (2013.01)

(58) Field of Classification Search
CPC ...................... A01K 89/0111; A01K 89/0113; A01K 89/03; A01K 89/01931
See application file for complete search history.

(56) References Cited

U.S. PATENT DOCUMENTS

| 4,875,639 A * | 10/1989 | Zurcher ............. A01K 89/0111 242/309 |
| 2015/0028143 A1* | 1/2015 | Hiraoka ............ A01K 89/0111 242/322 |
| 2018/0084769 A1* | 3/2018 | Tsutsumi ........... A01K 89/0111 |
| 2019/0200591 A1* | 7/2019 | Saito .................. A01K 89/0111 |
| 2020/0344989 A1* | 11/2020 | Grant ............... A01K 89/01931 |

FOREIGN PATENT DOCUMENTS

| EP | E P-1588614 A2 * | 10/2005 | ............. A01K 89/01 |
| EP | 2198706 A1 * | 6/2010 | ............. A01K 89/01 |
| EP | 2387881 A1 * | 11/2011 | ......... A01K 89/0111 |
| JP | 2014003964 A * | 1/2014 | ......... A01K 89/0111 |

* cited by examiner

*Primary Examiner* — Emmanuel M Marcelo
(74) *Attorney, Agent, or Firm* — WCF IP

(57) ABSTRACT

Disclosed is a positioning and line clamping device capable of realizing buffering. The device comprises a connecting base, wherein a spool is fixedly mounted at the upper end of the connecting base, and a sliding groove penetrates through the upper end of the outer side wall of the connecting base. According to the positioning and line clamping device, a fishing line is inserted from one end of a stopping block and pulled out from the other end of the stopping block after being pulled out from the spool by using a buffering and positioning assembly; the fishing line is wound on a batten, the length of the pulled-out fishing line becomes the use length of the fishing line through limiting of the batten and the stopping block when people do not conduct manual adjustment, and therefore the function of controlling the fishing range of the fishing line is achieved.

3 Claims, 2 Drawing Sheets

POSITIONING AND LINE CLAMPING DEVICE CAPABLE OF REALIZING BUFFERING

CROSS REFERENCE TO RELATED APPLICATION(S)

This patent application claims the benefit and priority of Chinese Patent Application No. 202011300783.7, filed on Nov. 19, 2020, the disclosure of which is incorporated by reference herein in its entirety as part of the present application.

TECHNICAL FIELD

The present disclosure relates to the technical field of fish reels, in particular to a positioning and line clamping device capable of realizing buffering.

BACKGROUND ART

Fish reel has a fishing line winding and unwinding function and becomes a main component of a fishing rod, an existing fish reel is usually composed of a winding and unwinding base, a spool and a force unloading adjusting knob, when people throw the fishing rod, a fishing line can be thrown out through inertia of gravity of the thrown object, and an existing spool does not have buffering capacity; when the spool is clamped or the fishing line on the spool is completely pulled out, the fishing line is easily pulled by inertia thrown by the thrown object, so that the fishing line is damaged; and the fishing range cannot be accurately controlled due to the fact that the existing spool does not have the function of controlling the length of the fishing line, so that a positioning and line clamping device capable of realizing buffering is provided.

SUMMARY

The purpose of the present disclosure is to provide a positioning and line clamping device capable of realizing buffering so as to solve the problem proposed in the background technology.

In order to achieve the purpose, the present disclosure provides the technical scheme that the positioning and line clamping device capable of realizing buffering comprises a connecting base, a spool is fixedly mounted at the upper end of the connecting base, the upper end of the spool is sleeved with a force unloading adjusting knob, a sliding groove penetrates through the upper end of the outer side wall of the connecting base, and a buffering and positioning assembly matched with the sliding groove is mounted at the top end of an inner cavity of the connecting base.

Preferably, the force unloading adjusting knob comprises a rotating block, the outer side wall of the rotating block is sleeved with a sleeving groove formed in the upper end of the bobbin, twisting blocks are fixedly mounted at the upper end of the rotating block, an extending rod is fixedly mounted at the middle part of the bottom surface of the rotating block, and a matching hole is formed in the bottom surface of the extending rod.

Preferably, a groove is formed in the outer side wall of the connecting base and located at the outer end of the sliding groove, and an arc-shaped chamfer is formed in the edge of the groove.

Preferably, the buffering and positioning assembly comprises a connecting shell, the outer side wall of the connecting shell is sleeved with a limiting groove formed in the upper surface of the inner cavity of the connecting base, the lower end of the connecting shell is sleeved with a fastening shell, an inner cavity of the connecting shell and an inner cavity of the fastening shell are sleeved with a spring, a through hole penetrates through the middle part of the connecting shell and the middle part of the fastening shell, the inner side wall of the through hole is sleeved with a fixed screw in threaded connection with the top surface of the limiting groove, the outer side wall of the fixed screw is sleeved with a batten, the batten is located at the lower end of the fastening shell and sleeved with the sliding groove, and a stopping block is fixedly mounted at the outer end of the batten and is sleeved with the groove.

Preferably, the fixed screw comprises a sleeving rod sleeved with the through hole, a hexagonal rotating block is integrally formed at the lower end of the sleeving rod, and a thread is formed in the upper end of the sleeving rod.

Compared with the prior art, the present disclosure has the beneficial effects that according to the positioning and line clamping device capable of realizing buffering, a fishing line is inserted from one end of the stopping block and pulled out from the other end of the stopping block after being pulled out from the spool by using the buffering and positioning assembly; at the moment, the fishing line is wound on the batten, the length of the pulled-out fishing line becomes the use length of the fishing line through limiting of the batten and the stopping block when people do not conduct manual adjustment, and therefore the function of controlling the fishing range of the fishing line is achieved; meanwhile, when the fishing line released through adjustment is completely thrown out through gravity during rod throwing, the batten can be pulled, so that the batten moves in the sliding groove; and meanwhile, the batten extrudes the fastening shell, and the fastening shell extrudes a spring to buffer the fishing line, so that the fishing line is prevented from being pulled by gravity to be damaged.

Reference signs in drawings: 1, connecting base; 2, bobbin; 3, force unloading adjusting knob; 31, rotating block; 32, sleeving groove; 33, twisting block; 34, extending rod; 35, matching hole; 4, sliding groove; 5, buffering and positioning assembly; 51, connecting shell; 52, limiting groove; 53, fastening shell; 54, spring; 55, through hole; 56, fixed screw; 561, sleeving rod; 562, hexagonal rotating block, 563, thread; 57, batten; 58, stopping block; 6, groove; and 7, arc-shaped chamfer.

DETAILED DESCRIPTION OF THE EMBODIMENTS

The following clearly and completely describes the technical scheme in the embodiments of the present disclosure with reference to the attached figures in the embodiments of the present disclosure. Apparently, the described embodiments are merely a part rather than all of the embodiments of the present disclosure. All other embodiments obtained by those skilled in the art based on the embodiments of the present disclosure without creative efforts shall fall within the protection scope of the present disclosure.

Figure 1:
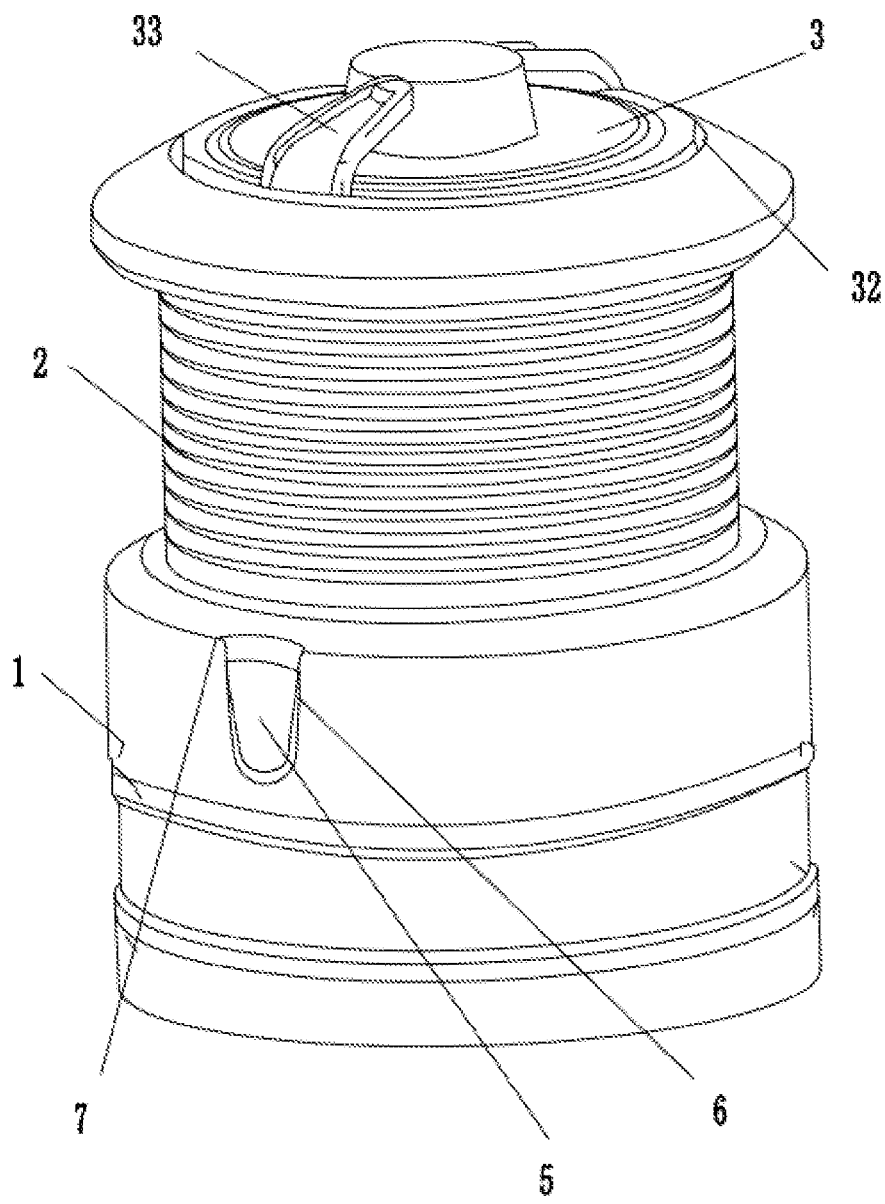
FIG. 1 is a structural schematic diagram of the present disclosure.
Figure 2:
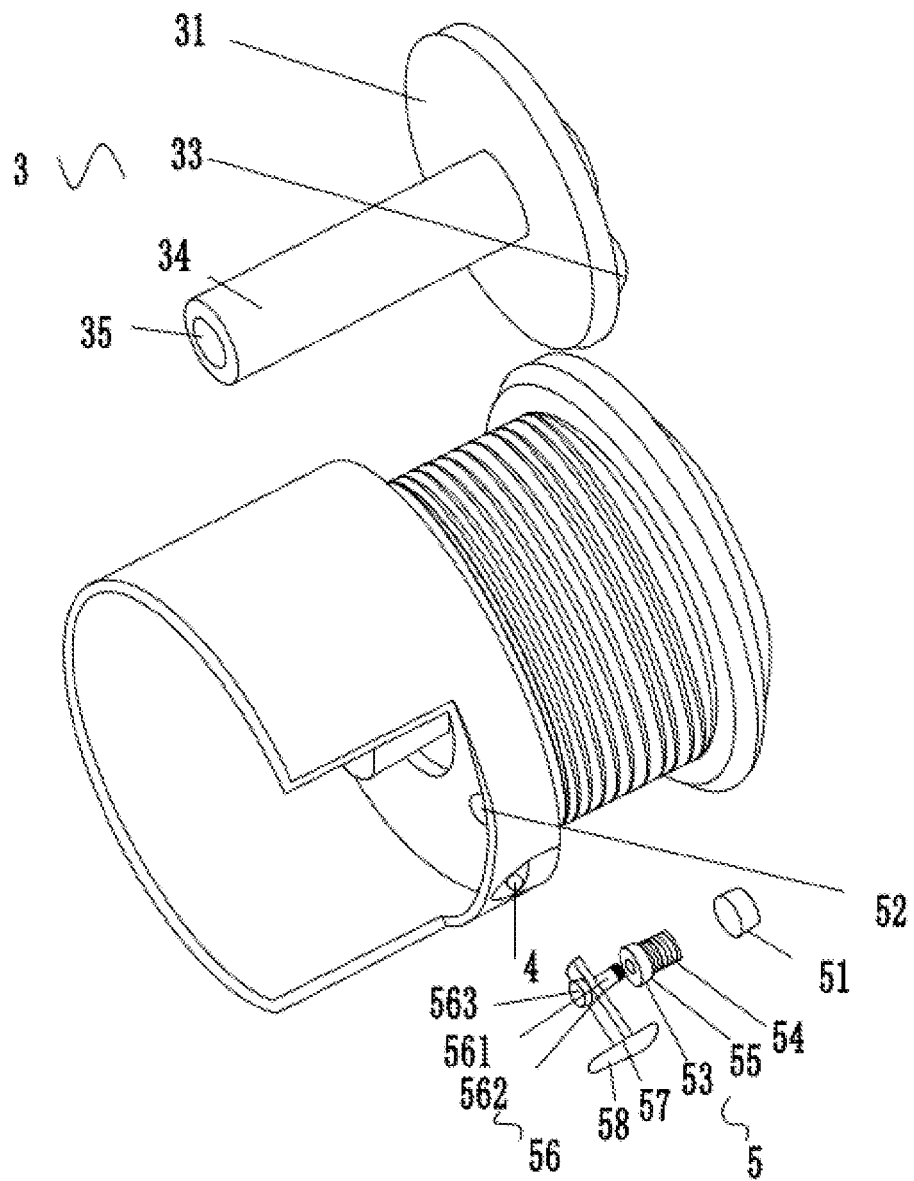
FIG. 2 is a disassembling diagram of the present disclosure.

Referring to FIG. 1 to FIG. 2, the present disclosure provides the technical scheme that a positioning and line clamping device capable of realizing buffering comprises a connecting base 1, a spool 2 is fixedly mounted at the upper end of the connecting base 1, the upper end of the spool 2 is sleeved with a force unloading adjusting knob 3, a sliding groove 4 penetrates through the upper end of the outer side wall of the connecting base 1, and a buffering and positioning assembly 5 matched with the sliding groove 4 is mounted at the top end of an inner cavity of the connecting base 1.

The connecting base 1 and a take-up and pay-off base are sleeved together, and the connecting base 1 is mounted through the force unloading adjusting knob 3.

Specifically, the force unloading adjusting knob 3 comprises a rotating block 31, the outer side wall of the rotating block 31 is sleeved with a sleeving groove 32 formed in the upper end of the bobbin 2, twisting blocks 33 are fixedly mounted at the upper end of the rotating block 31, an extending rod 34 is fixedly mounted at the middle part of the bottom surface of the rotating block 31, and a matching hole 35 is formed in the bottom surface of the extending rod 34.

The structure of the matching hole 35 is the same as that of a matching hole in an existing force unloading adjusting knob, and the twisting blocks 33 are used for conveniently rotating the rotating block 31, so that the force unloading adjusting knob 3 is conveniently adjusted, and the first pay-off function of the force unloading adjusting knob is conveniently adjusted.

Specifically, a groove 6 is formed in the outer side wall of the connecting base 1 and located at the outer end of the sliding groove 4, and an arc-shaped chamfer 7 is formed in the edge of the groove 6.

The groove 6 is used for shielding a stopping block 58 and preventing the stopping block 58 from protruding to the outside and being scratched and collided easily.

Specifically, the buffering and positioning assembly 5 comprises a connecting shell 51, the outer side wall of the connecting shell 51 is sleeved with a limiting groove 52 formed in the upper surface of the inner cavity of the connecting base 1, the lower end of the connecting shell 51 is sleeved with a fastening shell 53, an inner cavity of the connecting shell 51 and an inner cavity of the fastening shell 53 are sleeved with a spring 54, a through hole 55 penetrates through the middle part of the connecting shell 51 and the middle part of the fastening shell 53, the inner side wall of the through hole 55 is sleeved with a fixed screw 56 in threaded connection with the top surface of the limiting groove 52, the outer side wall of the fixed screw 56 is sleeved with a batten 57, the batten 57 is located at the lower end of the fastening shell 53 and sleeved with the sliding groove 4, and a stopping block 58 is fixedly mounted at the outer end of the batten 57 and is sleeved with the groove 6.

Specifically, the fixed screw 56 comprises a sleeving rod 561 sleeved with the through hole 55, a hexagonal rotating block 562 is integrally formed at the lower end of the sleeving rod 561, and a thread 563 is formed in the upper end of the sleeving rod 561.

No thread exists at the sleeved position of the sleeving rod 561 and the through hole 55, so that the situation that the thread hinders the through hole 55, and consequently the fastening shell 53 cannot extrude the spring 54 is prevented.

According to the working principle of the positioning and line clamping device, a fishing line is inserted from one end of the stopping block 58 and pulled out from the other end of the stopping block 58 after being pulled out from the spool 2 by using the buffering and positioning assembly 5; at the moment, the fishing line is wound on the batten 57, the length of the pulled-out fishing line becomes the use length of the fishing line through limiting of the batten 57 and the stopping block 58 when people do not conduct manual adjustment, and therefore the function of controlling the fishing range of the fishing line is achieved; meanwhile, when the fishing line released through adjustment is completely thrown out through lead during rod throwing, the batten 57 can be pulled, so that the batten 57 moves in the sliding groove 4; and meanwhile, the batten 57 extrudes the fastening shell 53, and the fastening shell extrudes the spring 54 to buffer the fishing line, so that the fishing line is prevented from being pulled by gravity to be damaged.

Although the embodiments of the present disclosure have already been illustrated and described, various changes, modifications, replacements and transformations can be made by those skilled in the art under the condition of without departing from the principle and the spirit of the present disclosure, and thus the scope of the present disclosure should be restricted by claims and equivalents thereof.

What is claimed is:

1. A positioning and line clamping device capable of realizing buffering, comprising a connecting base, wherein a spool is fixedly mounted at an upper end of the connecting base, an upper end of the spool is sleeved with a force unloading adjusting knob, a sliding groove penetrates through an upper end of an outer side wall of the connecting base, and a buffering and positioning assembly matched with the sliding groove is mounted at a top end of an inner cavity of the connecting base;

a groove is formed in the outer side wall of the connecting base and located at an outer end of the sliding groove, and an arc-shaped chamfer is formed in an edge of the groove; and the buffering and positioning assembly comprises a connecting shell, an outer side wall of the connecting shell is sleeved with a limiting groove formed in an upper surface of the inner cavity of the connecting base, a lower end of the connecting shell is sleeved with a fastening shell, an inner cavity of an connecting shell and an inner cavity of the fastening shell are sleeved with a spring, a through hole penetrates through a middle part of the connecting shell and a middle part of the fastening shell, an inner side wall of the through hole is sleeved with a fixed screw in threaded connection with a top surface of the limiting groove, an outer side wall of the fixed screw is sleeved with a batten, the batten is located at a lower end of the fastening shell and sleeved with the sliding groove, and a stopping block is fixedly mounted at an outer end of the batten and is sleeved with the groove.

2. The positioning and line clamping device capable of realizing buffering according to claim 1, wherein the force unloading adjusting knob comprises a rotating block, an outer side wall of the rotating block is sleeved with a sleeving groove formed in an upper end of a bobbin, twisting blocks are fixedly mounted at an upper end of the rotating block, an extending rod is fixedly mounted at a middle part of a bottom surface of the rotating block, and a hole is formed in a bottom surface of the extending rod.

3. The positioning and line clamping device capable of realizing buffering according to claim 1, wherein the fixed screw comprises a sleeving rod sleeved with the through hole, a hexagonal rotating block is integrally formed at a lower end of the sleeving rod, and a thread is formed in an upper end of the sleeving rod.

* * * * *